United States Patent
Kitazawa

(10) Patent No.: US 10,298,320 B2
(45) Date of Patent: May 21, 2019

(54) SPECTRUM ANALYSIS APPARATUS AND SPECTRUM ANALYSIS METHOD

(71) Applicant: SHARP KABUSHIKI KAISHA, Sakai, Osaka (JP)

(72) Inventor: Tazuko Kitazawa, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 0 days.

(21) Appl. No.: 15/890,329

(22) Filed: Feb. 6, 2018

(65) Prior Publication Data

US 2018/0234176 A1 Aug. 16, 2018

(30) Foreign Application Priority Data

Feb. 13, 2017 (JP) ................................. 2017-024136

(51) Int. Cl.
*H04B 10/07* (2013.01)
*H04B 10/079* (2013.01)
*H04B 15/02* (2006.01)
*H04L 27/26* (2006.01)

(52) U.S. Cl.
CPC ......... *H04B 10/0795* (2013.01); *H04B 15/02* (2013.01); *H04L 27/2628* (2013.01)

(58) Field of Classification Search
CPC .. H04B 10/0795; H04B 15/02; H04L 27/2628
USPC .................................................... 250/339.07
See application file for complete search history.

(56) References Cited

FOREIGN PATENT DOCUMENTS

JP 2013-190423 A 9/2013

*Primary Examiner* — David P Porta
*Assistant Examiner* — Gisselle M Gutierrez
(74) *Attorney, Agent, or Firm* — ScienBiziP, P.C.

(57) ABSTRACT

Interference noise is eliminated and fitting accuracy is enhanced.
A spectrum analysis apparatus includes an electromagnetic wave source configured to emit an electromagnetic wave having a wavelength from 0.1 mm to 10 mm, a spectrometer a detecting section configured to detect an emitted electromagnetic wave that exits from the measurement object, the wave being transmitted through or reflected by the measurement object, and to generate a detection signal; and an analyzing section configured to analyze the detection signal. The analyzing section has a noise eliminating unit configured to generate a noise eliminated signal by eliminating from the detection signal a round-trip electromagnetic wave having reciprocated twice or more inside the measurement object and then emitted from the measurement object, in the emitted electromagnetic wave. Furthermore, the analyzing section is configured to generate a transmission or reflection spectrum that is a corrected detection signal by using the noise eliminated signal.

11 Claims, 13 Drawing Sheets

SPECTRUM ANALYSIS APPARATUS AND SPECTRUM ANALYSIS METHOD

CROSS-REFERENCE TO RELATED APPLICATIONS

This application claims the benefit of Japanese Patent Application No. 2017-024136 filed Feb. 13, 2017 in the Japan Patent Office, and the entire disclosure of Japanese Patent Application No. 2017-024136 is incorporated herein by reference.

BACKGROUND

Technical Field

The disclosure below relates to a spectrum analysis apparatus for spectrum analyzing the physical properties of an object using an electromagnetic wave.

Related Art

When impinged on a substance to be irradiated, a terahertz (THz) band electromagnetic waves (hereinafter, referred to as "terahertz wave") is reflected or transmitted depending on the substance. Such a THz-band electromagnetic wave may be used to identify the physical properties of the substance by measuring the characteristics of an electromagnetic wave transmitted through the substance and an electromagnetic wave reflected from the substance. For example, a terahertz-wave spectrometer irradiates a measurement object with a terahertz wave emitted from an electromagnetic wave source, detects a terahertz wave emitted from the measurement object, and measures the THz-band optical constant of the measurement object.

Such a spectrometer is disclosed, for example, in JP 2013-190423 A (published on Sep. 26, 2013). This spectrometer uses a sample cell with a thickness continuously changing in one direction, irradiates a sample in the sample cell with lights on at least two sites of different thickness, measures the intensities of the transmitted lights, and determines absorption coefficient, using the thickness difference between the measurement sites, which is determined based on the interference fringes of the light transmitted through a predetermined section of the sample cell, and using the intensities of the aforementioned transmitted light.

SUMMARY

The THz-band electromagnetic wave has an about submillimeter to millimeter wavelength which is near the thickness of a usually handled object. Thus, when such an object is used as a measurement object to be measured for the optical constant, interference noises may occur. For this reason, there is the problem that precise analysis (calculation of an optical constant) is not ensured for continuous wave (Continuous Wave: CW) measurement. Thus, it has been demanded to eliminate interference noises in the continuous wave measurement.

Furthermore, there is also the problem that absorption produced at the THz band is so broad that fitting accuracy by dielectric model is low.

It is an object of one embodiment according to the present disclosure to eliminate the interference noises and to enhance the fitting accuracy.

To solve the problems above, a spectrum analysis apparatus according to one embodiment of the present invention includes an electromagnetic wave source configured to emit an electromagnetic wave having a wavelength from 0.1 mm to 10 mm, a detecting section configured to detect an emitted electromagnetic wave from the measurement object, the wave being transmitted through or reflected by the measurement object, and to generate a detection signal, and an analyzing section configure to analyze the detection signal, wherein the analyzing section includes an electromagnetic wave eliminating unit configured to eliminate a round-trip electromagnetic wave that has been reciprocated twice or more inside the measurement object and then emitted from the measurement object, and to generate a noise eliminated signal, in the emitted electromagnetic wave, and the analyzing section generates a transmission spectrum or a reflection spectrum that is a corrected detection signal by the noise eliminated signal.

According to one embodiment of the present invention, advantageous effects are produced that the interference noise is eliminated and the fitting accuracy is enhanced.

BRIEF DESCRIPTION OF THE DRAWINGS

The disclosure will be described with reference to the accompanying drawings, wherein like numbers reference like elements.

DESCRIPTION OF EMBODIMENTS

First Embodiment

Hereinafter, a first embodiment of the invention will be described with reference to FIGS. 1 to 7.

Figure 1:
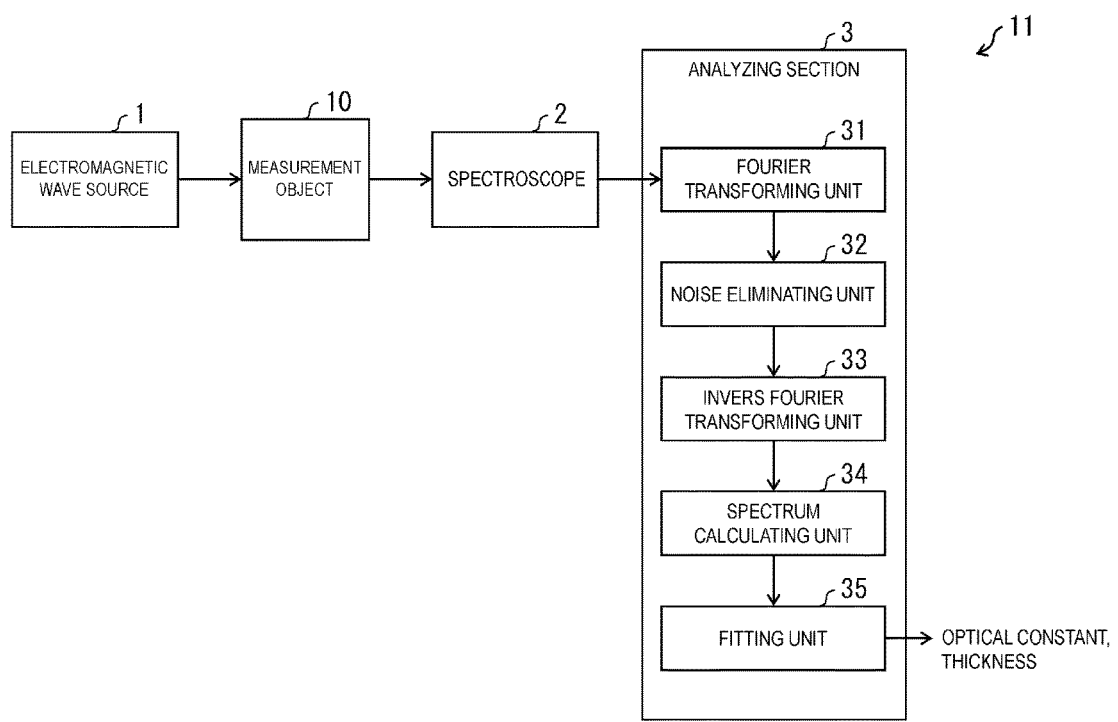
FIG. 1 is a block diagram illustrating a structure of a spectrum analysis apparatus according to a first embodiment of the present invention.
Figure 2:
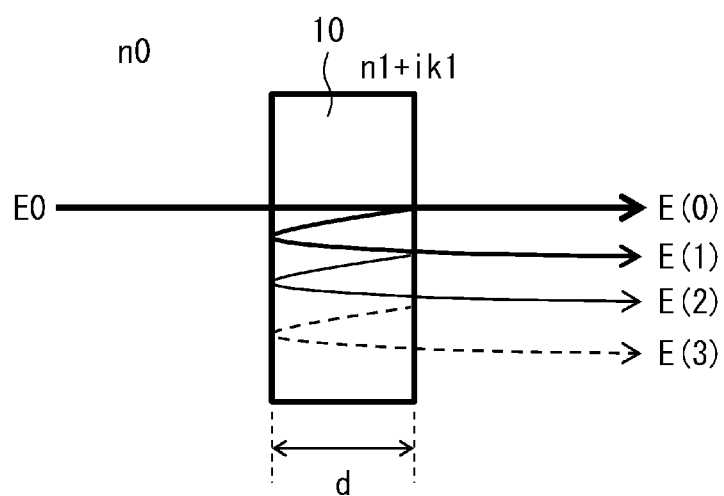
FIG. 2 is a diagram illustrating a transmission-and-reflection state of an electromagnetic wave in a measurement object which has an optical constant to be analyzed by the aforementioned spectrum analysis apparatus.

FIG. 1 is a block diagram illustrating a structure of a spectrum analysis apparatus 11 according to the embodiment. FIG. 2 is a diagram illustrating a transmission-and-reflection state of an electromagnetic wave in a measurement object 10 whose physical properties are to be measured by the spectrum analysis apparatus 11.

As illustrated in FIG. 1, the spectrum analysis apparatus 11 includes an electromagnetic wave source 1, a spectrometer 2 (detecting section), and an analyzing section 3. The spectrum analysis apparatus 11 irradiates a solid measurement object 10, which has an optical constant to be measured, with a continuous electromagnetic wave, detects an electromagnetic wave emitted from the measurement object 10, and calculates, in particular, the optical constant as a physical property of the measurement object 10 based on the detected electromagnetic wave.

The electromagnetic wave source 1 generates a wavelength-variable THz-band continuous (CW) electromagnetic wave. The electromagnetic wave source 1 emits an irradiation electromagnetic wave having a wavelength of about submillimeter to millimeter (specifically, 0.1 mm to 10 mm) toward the measurement object 10. For example, the irradiation wave source 1 is a laser. The irradiation wave source 1, however, is not limited to the laser, and may be any source capable of emitting an electromagnetic wave having a wavelength of about submillimeter to millimeter.

The spectrometer 2 separates and detects the electromagnetic wave having passed through the measurement object 10 (the emitted electromagnetic wave from the measurement object 10). Specifically, as illustrated in FIG. 2, among the electromagnetic wave having an electric field E(0) which incident the measurement object 10, the spectrometer 2 detects the intensity I(f), which is the square of the absolute value of an electric field E(f), and generates a detection signal. The electric field E(f) is a superposition of an electric field E(0) of the electromagnetic wave which passes through the measurement object 10 as it is without reciprocating therein, and electric fields E(1), E(2), . . . of the electromagnetic wave which has reciprocated inside the measurement object 10. The measurement object 10 has a complex refraction index (n1+ik1). In the complex refraction index, "n1" in the real part of the complex refraction index represents a refractive index, and "k" in the imaginary part of the complex refraction index represents an extinction coefficient.

The analyzing section 3 carries out an analysis on the intensity of the electromagnetic wave detected by the spectrometer 2, and thereby derives the optical constant of the electromagnetic wave of the measurement object 10 as a physical property to absorb the electromagnetic wave. To perform this analysis, the analyzing section 3 includes a Fourier transforming unit 31, a noise eliminating unit 32 (electromagnetic wave eliminating unit), an inverse Fourier transforming unit 33, a spectrum calculating unit (a spectrum generating unit), and a fitting unit 35.

The Fourier transforming unit 31 Fourier-transforms the electromagnetic wave intensity I(f) that is output from the spectrometer 2. Using Fourier transform processing, the Fourier transforming unit 31 outputs a Fourier transform signal including a plurality of peaks, as a spectrum of the intensity I(f).

The noise eliminating unit 32 eliminates the second or higher order peaks (unnecessary peaks) from the Fourier transform signal obtained by Fourier-transforming the electromagnetic wave intensity I(f). Specifically, the noise eliminating unit 32 eliminates the second or higher order peaks respectively corresponding to the electromagnetic waves having reciprocated twice or more inside the measurement object 10 (round-trip electromagnetic waves), and eliminates an interference peak which occurs in another optical component or between other optical components, and then generates a corrected detection signal. As used herein, the "other optical components" include a lens, a prism, a polarizing plate, a wave plate, a cap of the electromagnetic wave source 1, etc. Furthermore, the noise eliminating unit 32 may also eliminate information about the second or higher order peaks. In addition, the noise eliminating unit 32 may also eliminate information between the zeroth order peak and the first order peak, if the zeroth order peak and the first order peak are completely separated.

The inverse Fourier transforming unit 33 restores the intensity of the emitted electromagnetic wave as a corrected detection signal (a transmission spectrum or a reflection spectrum) by inversely Fourier-transforming the noise eliminated signal from which the peak was eliminated by the noise eliminating unit 32.

The spectrum calculating unit 34 calculates a transmittance spectrum representing the transmittance of the emitted electromagnetic wave (or a reflectance spectrum representing the reflectance of the emitted electromagnetic wave) based on the corrected detection signal output from the inverse Fourier transforming unit 33. Specifically, the spectrum calculating unit 34 calculates the transmittance by dividing the corrected detection signal (transmission intensity) that is output from the inverse Fourier transforming unit 33 for each frequency of the emitted electromagnetic wave (spectrum) by the corrected detection signal (input intensity) that is output from the inverse Fourier transforming unit 33 and input to the measurement object 10. Similar to the emitted electromagnetic wave, the incident electromagnetic wave is also determined by the spectrometer 2, the Fourier transforming unit 31, the noise eliminating unit 32, and the inverse Fourier transforming unit 33 without the measurement object 10.

The fitting unit 35 determines the optical constant of the measurement object 10 by carrying out fitting processing based on the transmittance spectrum that is output from the spectrum calculating unit 34. The fitting unit 35, for example, calculates a model transmittance spectrum using refractive index and extinction coefficient a without frequency dependence, assuming that there is no dispersion of the optical constant of the measurement object 10. Then, the fitting unit 35 specifies the refractive index and the extinction coefficient of the measurement object 10 by fitting the model transmittance spectrum to the transmittance spectrum calculated by the spectrum calculating unit 34. Furthermore, the fitting unit 35 may specify the reflective index and extinction coefficient of the measurement object 10 by calculating the model reflectance spectrum by use of a dielectric model of the measurement object 10, and fitting the model reflectance spectrum to the reflectance spectrum calculated by the spectrum calculating unit 34. Furthermore, the fitting unit 35 may express a frequency dependent optical constant by the dielectric model, and may fit the physical property parameters of the dielectric model in the same manner as described above. The optical constant may be determined from the fit physical parameters, using the dielectric model. The thickness of the measurement object 10 may be a separately measured result, or may be determined by fitting.

In the following, description will be given on operations (for a spectrum analysis apparatus analysis method) of the spectrum analysis apparatus 11 configured as described above.

Figure 3A:
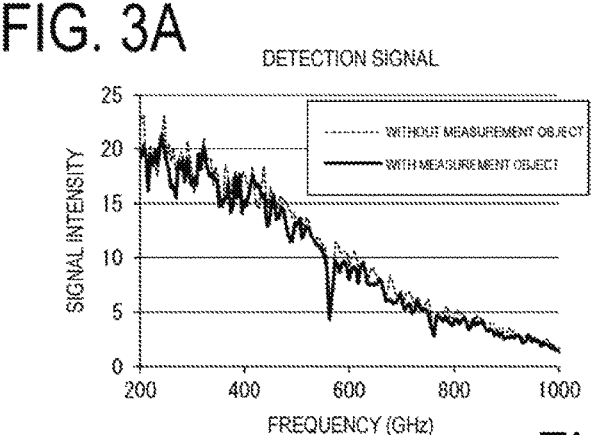
FIGS. 3A to 3E are diagrams illustrating the waveforms of signals output from different sections of the spectrum analysis apparatus above.
Figure 3B:
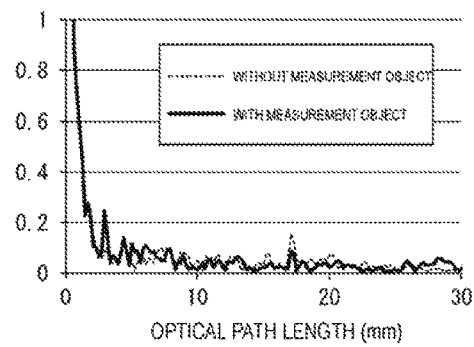
Figure 4:
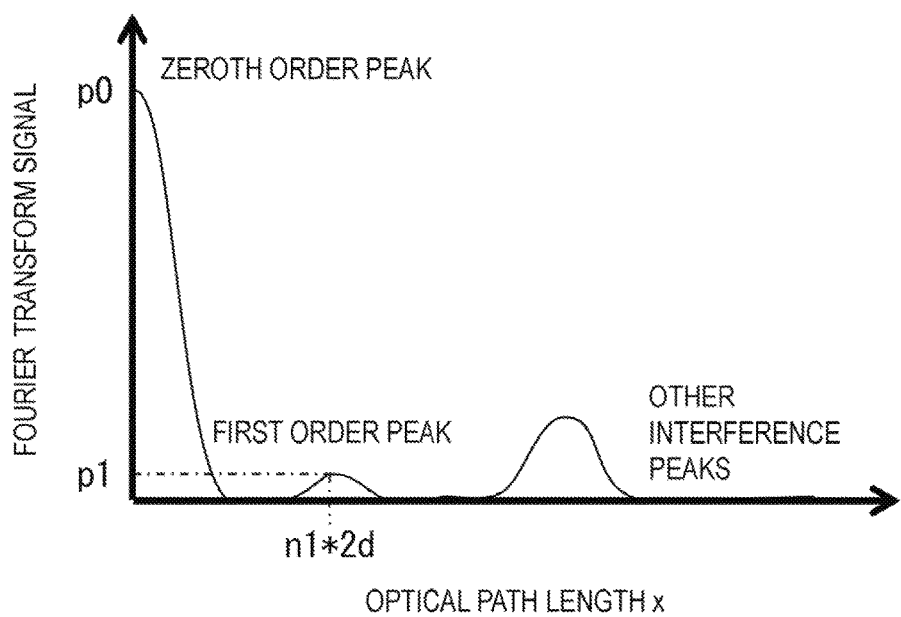
FIG. 4 is a diagram illustrating a Fourier transform signal which is output by a Fourier transforming unit in the aforementioned spectrum analysis apparatus.
Figure 5A:
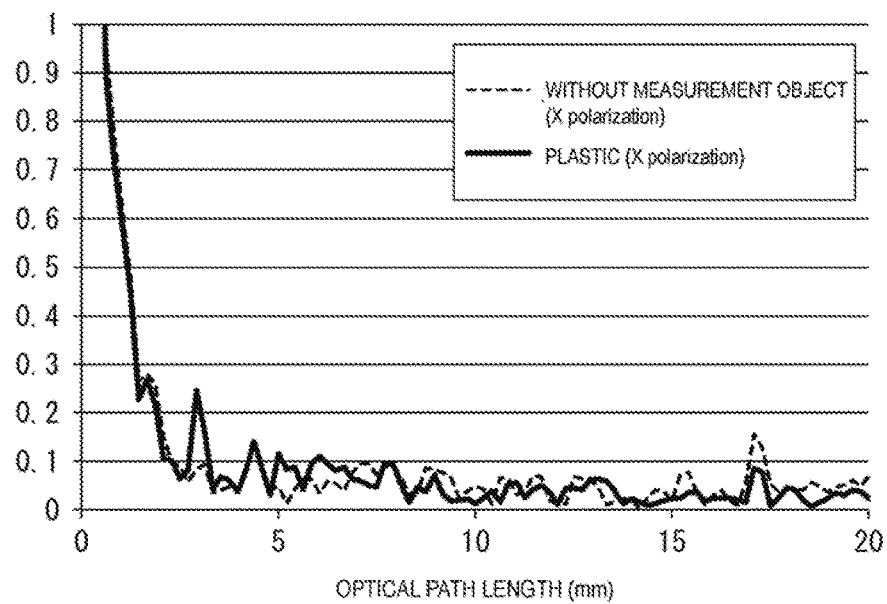
FIG. 5A is a diagram illustrating another Fourier transform signal when an electromagnetic wave with x polarization is used which is output from the aforementioned Fourier transforming unit.
Figure 5B:
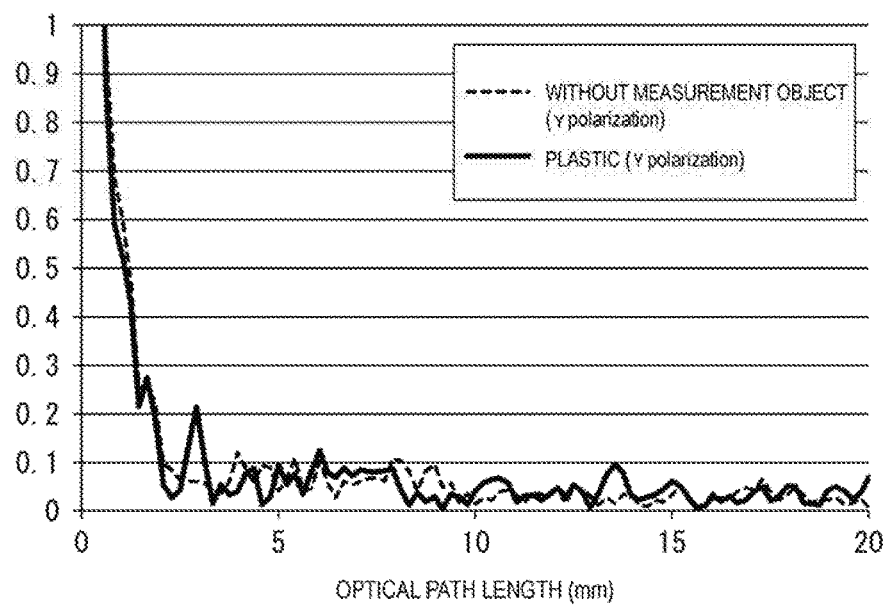
FIG. 5B is a diagram illustrating still another Fourier transform signal when an electromagnetic wave with y polarization is used which is output from the aforementioned Fourier transforming unit.
Figure 6:
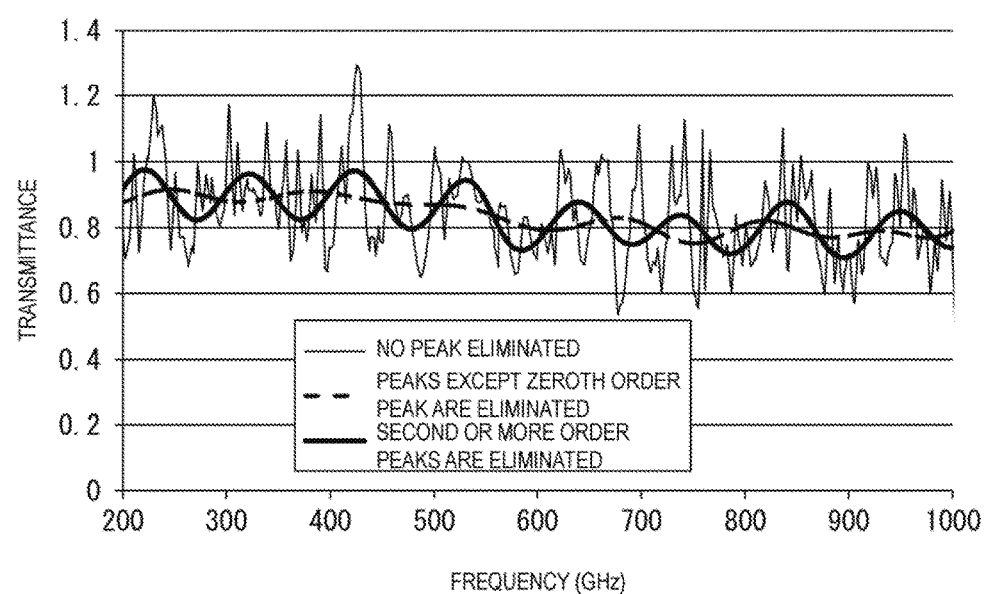
FIG. 6 is a diagram illustrating a transmittance spectrum obtained by a spectrum calculating unit in the aforementioned spectrum analysis apparatus.
Figure 7A:
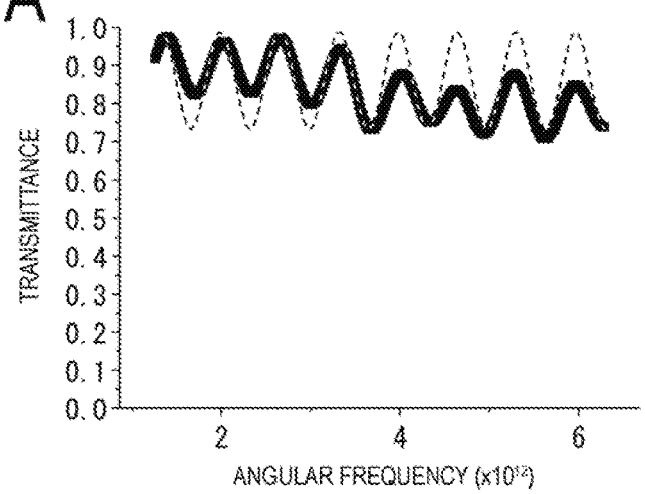
FIGS. 7A to 7C are diagrams illustrating the fitting results obtained a fitting unit in the aforementioned spectrum analysis apparatus.
Figure 7B:
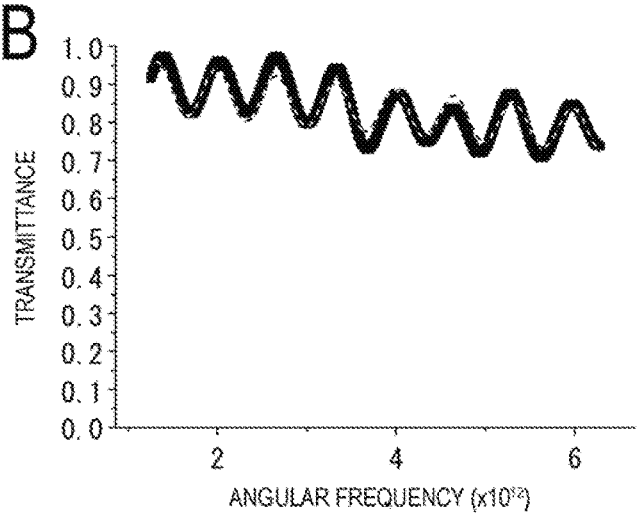
Figure 7C:
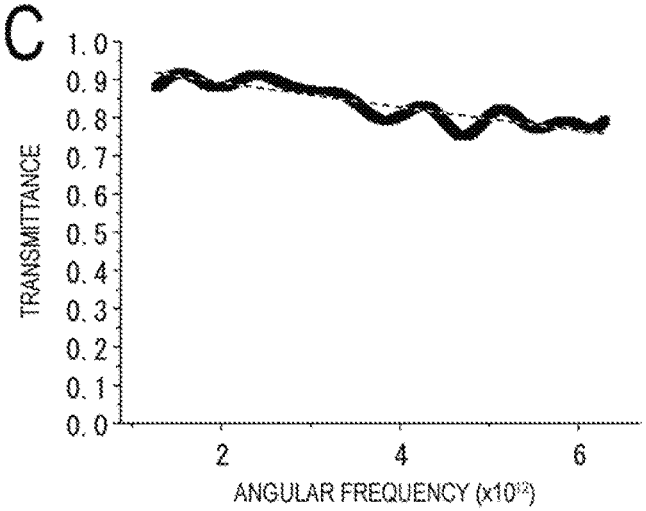

FIGS. 3A to 3E are diagrams illustrating the waveforms of signals output from different sections of the spectrum analysis apparatus 11 above. FIG. 4 is a diagram illustrating a transmission-and-reflection state of an electromagnetic wave in the measurement object 10 which has the optical constant to be analyzed by the spectrum analysis apparatus 11. FIG. 5A is a graph illustrating a Fourier transform signal when an electromagnetic wave with x polarization is used which is output from the Fourier transforming unit 31 of the spectrum analysis apparatus 11. FIG. 5B is a graph illustrating a Fourier transform signal when an electromagnetic wave with y polarization is used which is output from the Fourier transforming unit 31 of the spectrum analysis apparatus 11. FIG. 6 is a diagram illustrating a transmittance spectrum obtained by the spectrum calculating unit 34. FIGS. 7A to 7C are diagrams illustrating the fitting results obtained by the fitting unit 35.

First, the electromagnetic wave emitted from the electromagnetic wave source 1 enters the measurement object 10 as an incident electromagnetic wave, and passes through the inside of the measurement object 10. The measurement object 10 has a rectangular parallelepiped shape with a complex refraction index N1 (=n1+ik1) and a thickness d. As illustrated in FIG. 2, the measurement object 10 is disposed in a medium with a refractive index n0.

FIGS. 3A to 3E also illustrate the signal waveforms when the measurement object 10 is absent as described later. In FIGS. 3A to 3E, the signal waveforms when the measurement object 10 is present is indicated by solid lines, and the signal waveforms when the measurement object 10 is absent is indicated by broken lines.

As illustrated in FIG. 2, when the incident electromagnetic wave passes through the measurement object 10, apart of the incident electromagnetic wave having the electric field E0 passes through the measurement object 10 as a zeroth order transmitted electromagnetic wave having the electric field E(0). Meanwhile, apart of the incident electromagnetic wave is reflected by the output surface of the measurement object 10 and is further reflected by the incident surface of the measurement object 10 (i.e., reciprocates once), and then, a part thereof is output from the measurement object 10 as a first order transmitted electromagnetic wave with the electric field E(1). Furthermore, a part of the first order transmitted electromagnetic wave is reflected by the output surface of the measurement object 10 and is further reflected by the input surface of the measurement object 10, and then, apart thereof is output from the measurement object 10 as a second order transmitted electromagnetic wave with the electric field E(2). Furthermore, a part of the second order transmitted electromagnetic wave is reflected by the output surface of the measurement object 10 and is further reflected by the input surface of the measurement object 10, and then, a part thereof is output from the measurement object 10 as a third order transmitted electromagnetic wave with the electric field E(3). Although not illustrated, a k-th order electromagnetic wave, which is the fourth or more order electromagnetic wave, emitted from the measurement object 10 in a similar way.

As described above, multiple reflection of the incident electromagnetic wave occurs in the measurement object 10. Thus, the electric field E(0) is strongest, and the electric field E(1), the electric field E(2), the electric field E(3), . . . are gradually attenuated in this order. For example, the electric field E(0)) ($E^{(0)}(f)$) is represented by Expression (1), and the electric field E(1) ($E^{(1)}(f)$) is represented by Expression (2). Furthermore, the electric field summation E(F) of the electric field E(1), the electric field E(2), the electric field E(3), . . . is represented by Equation (3) and Expression (4).

In Expression (4), t and r are represented by t=2/(N1+n0), and r=(N1−n0)/(N1+n0), respectively. Furthermore, in Expression (4), i represents the imaginary unit, and c represents the speed of light.

[Equation 1]

$$(E^{(0)})(f)=t^2 E_0 \exp[i 2\pi f N1 d/c] \qquad (1)$$

[Equation 2]

$$E^{(1)}(f)=t^2 r^2 \exp[i 2\pi f 3 N1 d/c] \qquad (2)$$

[Equation 3]

$$E(f)=(f)+(E^{(0)}(f)+E^{(1)}(f)+(E^{(2)}(f)+ \qquad (3)$$

[Equation 4]

$$E(f)=t^2 E_0 \exp[i 2\pi f N1 d/c](1+r^2 \exp[i 2\pi f 2 N1 d/c]+ \qquad (4)$$

Furthermore, the intensity I(f) of emitted electromagnetic wave having passed through the measurement object 10 is represented by Expression (5) based on the electric field E(f).

[Equation 5]

$$I(f)=|E(f)|^2=t^4 I_0 |1+r^2 \exp[i 2\pi f 2 N1 d/c]+ \ldots |^2 \qquad (5)$$

The spectrometer 2 measures the electric field E(f) and intensity I(f) of the emitted electromagnetic wave. The intensity I(f) is a spectrum depending on wavelength or frequency, and is output from the spectrometer 2 as a detection signal illustrated in FIG. 3A. Furthermore, in the analyzing section 3, the Fourier transforming unit 31 Fourier-transforms the intensity I(f) of the emitted electromagnetic wave, and outputs the result as a Fourier transform signal as illustrated in FIG. 3B.

The intensity I(f) of the Fourier-transformed emitted electromagnetic wave maybe separated depending on a distance that the incident electromagnetic wave reciprocates in the measurement object 10 (a multiple of 2d). Specifically, as illustrated in FIG. 4, the Fourier transform signal, which is output from the Fourier transforming unit 31, represents the spectrum of the emitted electromagnetic wave intensity (intensity spectrum). The zeroth order peak p0 appears at the optical path length x=0 (the origin), and the first order peak p1 appears at the optical path length x=n1*2d, where "* (asterisk)" means multiplication.

For the THz band measurement, an optical component itself generated interference noise. Then, the spectrometer 2 measures an electromagnetic wave in a state in which the measurement object 10 is not provided (a direct incident electromagnetic wave) as well as an emitted electromagnetic wave in a state in which the measurement object is provided. The direct incident electromagnetic wave directly enters the spectrometer 2 from the incident electromagnetic wave source 1 without passing through the measurement object 10. The Fourier transforming unit 31 Fourier-transforms the direct incident electromagnetic wave as well as the emitted electromagnetic wave. This allows the noise eliminating unit 32 to compare the Fourier transform signal of the emitted electromagnetic wave with the Fourier transform signal of the direct incident electromagnetic wave, and to thereby distinguish the peak corresponding to the interference in the measurement object 10 from the other peaks.

The transmittance T(f), which obtained by dividing the intensity I(f) of the emitted electromagnetic wave from the measurement object 10 by the electromagnetic wave in the state in which the measurement object 10 is not provided (the direct incident electromagnetic wave), is represented by Expression (6), and is a frequency dependent spectrum.

[Equation 6]

$$T(f) = t^4 |1 + r^2 \exp[i 2\pi f 2 N 1 d/c] + \ldots |_2 \qquad (6)$$

Furthermore, it is possible to determine more accurate whether the peak corresponds to the interference in the measurement object 10 by an incident electromagnetic wave with x polarization and an incident electromagnetic wave with y polarization to measure the intensities of the emitted electromagnetic waves respectively. For example, FIGS. 5A and 5B illustrates the Fourier transform signals when the measurement object 10 is absent and the Fourier transform signal when the measurement object 10 is present.

FIG. 5A illustrates a Fourier transform signal when the electromagnetic wave with x polarization is used, and FIG. 5B illustrates a Fourier transform signal when the electromagnetic wave with y polarization is used. In both FIG. 5A and FIG. 5B, a solid line is used to represent the case in which the measurement object 10 (plastic plate) is present, and a broken line is used to represent the case in which the measurement object 10 is absent. When the electromagnetic wave with x polarization is used, the peaks, which appear only when the measurement object 10 is present, appear at the optical path lengths of 3 mm, 5 mm, and 6 mm, as illustrated in FIG. 5A. In contrast, when the electromagnetic wave with y polarization is used, the peaks, which appear only when the measurement object 10 is present, appear at the optical path lengths of 3 mm, 10.5 mm, and 13.5 mm, as illustrated in FIG. 5B. Accordingly, it is noted that a peak derived from the measurement object 10 is the peak at the optical path length of 3 mm. In this way, when only one of the x polarization and the y polarization is used, it is unclear which peak is derived from the measurement object 10. In contrast, measuring using the two polarizations makes it possible to determine the peak derived from the measurement object 10.

As can be seen from FIGS. 5A and 5B, it is easy to determine whether a specific peak is derived from the measurement object 10 by superposing the measurement results obtained using the x polarization and the y polarization. With only one Fourier transform signal, it is impossible to clearly determine whether a certain peak is a peak derived from the measurement object 10 or a noise derived from a factor other than the measurement object 10. For this reason, Fourier transform signals for the intensities of the x and y polarization electromagnetic waves are used here.

When a THz wave perpendicularly enters the measurement object 10, although no difference may be found between the x polarization and the y polarization, they are different in effect of random noise. Furthermore, difference appears therebetween by the fact that optical adjustment is not complete. These differences influence the transmission intensity and do not influence the optical path length, so that the positions of the zeroth order peak and first order peak do not change. Thus, when measurement is carried out using two polarizations which are different in direction, the peaks that appear at the same optical position may be determined to be derived from the measurement object 10. Furthermore, the measurement object 10 may be intentionally tilted so that the x and y polarizations are incident into the measurement object 10 as s and y polarizations, so that the transmittance thereof are made difference with the same optical path length. In this case, it possible to more accurately determine whether the peak is derived from the measurement object 10 by verifying that the ratio of peak values when measurement is carried out using electromagnetic waves having two polarizations which are different in direction corresponds to the ratio of transmittances with p and s polarizations. In the example illustrated in FIGS. 5A and 5B, what is necessary is to extract the range of optical path length from 0 to 4 mm (and the range symmetrical thereto) including the peak at the optical path length of about 3 mm.

Furthermore, the two results obtained using the x polarization and y polarization may be subjected to fitting not to get influenced by one transmittance error.

The polarizations used here are not limited to the x polarization and the y polarization, but only have to be two polarizations which are different in direction. They do not need to be orthogonal to each other. For measurement without the measurement object 10, if there is nothing in an optical path that makes a transmittance, a reflectance, or an absorption index polarization-dependent, only an electromagnetic wave with a single-direction polarization may be used.

Furthermore, if another peak is present between the zeroth-order peak and the first-order peak, there is a possibility that when the other peak is eliminated, the information of the zeroth order peak and the first order peak (skirt-part information) may also be eliminated. For this reason, it is preferred that there is no other interference peak between the zeroth order peak and the first order peak.

Figure 3C:
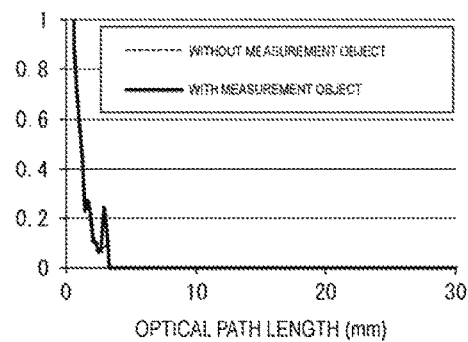

While leaving only the zeroth order peak p0 of the zeroth order transmitted electromagnetic wave and the first order peak p1 of the first order transmitted electromagnetic wave, the noise eliminating unit 32 eliminates the other peaks, which are the peaks by the second and more order transmitted electromagnetic waves or a peak by multiple reflection of an electromagnetic wave, i.e., the second or higher order peaks, from the resultant Fourier transform signal, and thereby generates a noise eliminated signal as illustrated in FIG. 3C. Specifically, the noise eliminating unit 32 extracts a predetermined range of optical path length including the zeroth order peak p0 and the first order peak p1 from the Fourier transform signal. Furthermore, the noise eliminating unit 32 multiplies the values of the zeroth order peak p0 and the first order peak p1 by "1" as a filtering coefficient, and multiplies the values other than those of the zeroth order peak p0 and the first order peak p1 (unnecessary peaks) by "0" as a filtering coefficient. Alternatively, the noise eliminating unit 32 may input 0 as the unnecessary peak values as described above.

The inverse Fourier transforming unit 33 restores the intensity of the emitted electromagnetic wave as a corrected detection signal by inversely Fourier-transforming the noise eliminated signal which was output from the noise eliminating unit 32 as represented by Expression (7). The corrected detection signal contains signals and noises by peaks of the frequency components only from the zeroth order peak to the first order peak.

$$T(x) = \int_{f_m}^{f_M} t^4\{1 + r^4 + 2r^2 \cos(2\pi f 2N1d/c)\}\exp\left[i\frac{2\pi}{c}fx\right]df \quad (7)$$

$$= -t^4 i \frac{c}{2\pi} \frac{(1+r^4)\left\{\exp\left[i\frac{2\pi}{c}f_M x\right] - \exp\left[i-\frac{2\pi}{c}f_m x\right]\right\}}{x}$$

$$+ \frac{r^2\left\{\exp\left[i\frac{2\pi}{c}f_M(x-2N1d)\right] - \exp\left[i\frac{2\pi}{c}f_m(x-2N1d)\right]\right\}}{(x-2N1d)}$$

$$+ \frac{r^2\left\{\exp\left[i\frac{2\pi}{c}f_M(x+2N1d)\right] - \exp\left[i\frac{2\pi}{c}f_m(x+2N1d)\right]\right\}}{(x+2N1d)}$$

Figure 3D:
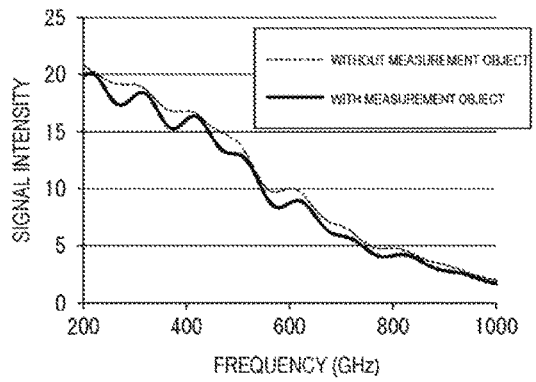

Here, the Fourier transforming unit 31 also Fourier-transforms the intensity of the direct incident electromagnetic wave (a reference detection signal) measured by the spectrometer 2 as mentioned above. Furthermore, the noise eliminating unit 32 eliminates the second or higher order peaks from the Fourier transform signal of the direct incident electromagnetic wave similar to the Fourier transform signal of the electromagnetic wave having passed through the measurement object 10. In addition, the inverse Fourier transforming unit 33 inversely Fourier-transforms the direct incident electromagnetic wave from which the peaks were eliminated as described above. The direct incident electromagnetic wave restored by the inverse Fourier transform is obtained as a corrected reference detection signal which contains no interference noises corresponding to the aforementioned peaks as illustrated in FIG. 3D.

Figure 3E:
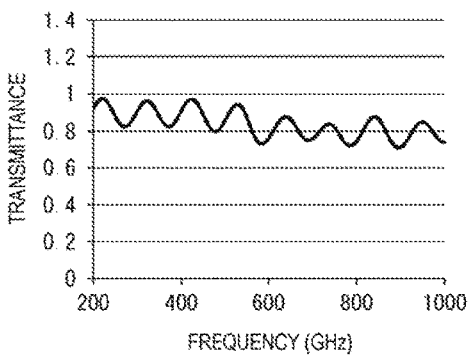

Then, the spectrum calculating unit 34 calculates a transmittance spectrum as illustrated in FIG. 3E based on the electromagnetic wave intensity that is output from the inverse Fourier transforming unit 33. When calculating the transmittance spectrum, the spectrum calculating unit 34 calculates the transmittance by dividing the intensity of the emitted electromagnetic wave (the corrected detection signal) that is output from the inverse Fourier transforming unit 33 for each frequency of the emitted electromagnetic wave by the intensity of the direct incident electromagnetic wave in which the interference noise was eliminated (the corrected reference detection signal).

The second or higher order peaks have been eliminated from the direct incident electromagnetic wave in the same manner as from the electromagnetic wave having passed through the measurement object 10. As a result, in the transmittance spectrum, the interference noises corresponding to the second or higher order peaks have been eliminated. Thus, the transmittance spectrum obtained by the spectrum calculating unit 34 is determined as a more accurate value in which the aforementioned interference noises are not contained.

As indicated by a thick solid line in FIG. 6, when the second or higher order peaks are eliminated, noises mainly caused by the first order peak remain in the transmittance spectrum. In contrast, as a comparative example, when the peaks are not eliminated from the Fourier transform signal, a lot of noises are contained in the transmittance spectrum as indicated by a thin solid line in FIG. 6. As another comparative example, when the peaks (including the first order peak) other than the zeroth order peak are eliminated, noises are almost eliminated, and a transmittance spectrum which changes smoothly is obtained as indicated by the broken line in FIG. 6.

The fitting unit 35 carries out the fitting processing based on the transmittance spectrum calculated by the spectrum calculating unit 34. First, the fitting unit 35 generates a model transmittance spectrum using a transmittance spectrum model of the measurement object 10, and fits this model transmittance spectrum to the aforementioned transmittance spectrum. In this time, the fitting unit 35 sets the initial value of the complex refraction index, and fits the model transmittance spectrum to the transmittance spectrum while adjusting parameters including the refractive index and the extinction coefficient. Then, the fitting unit 35 specifies the convergence values of the refractive index and extinction coefficient when the model transmittance spectrum is fitted to the transmittance spectrum as the optical constant of the measurement object 10.

FIGS. 7A to 7C illustrate the aforementioned transmittance spectrum, and the result of fitting the refractive index, the extinction coefficient, and the thickness of the measurement object 10 by the fitting unit 35, assuming that there is no refractive index dispersion. In FIGS. 7A to 7C, the broken line indicates the model transmittance spectrum, the solid line indicates the result of the transmittance spectrum, and each spectrum is represented as the transmittance with respect to the angular frequency. The initial value of the refractive index was set to Refractive Index n (n1=1.46) calculated from the interference peak position (optical path length), assuming that the thickness of the measurement object 10 is 1 mm. As the thickness of the measurement object 10, a separately measured value is used. If the reliability of the separately measured value is high, the thickness may be fixed to the measured value. However, this time, a less-accurate measurement method was used, so that the thickness was also fitted. Furthermore, the extinction coefficient k was fixed to k=0.0. As a result of the fitting, n=1.76 and the thickness was 0.81. This time, the fitting error was 48.7*10$^{-4}$. Furthermore, as illustrated in FIG. 7A, the interference periods of the model transmittance spectrum and the transmittance spectrum are substantially identical, so that it was found that the refractive index has almost no dispersion. Meanwhile, the transmittance values do not agree with each other between the model transmittance spectrum and the transmittance spectrum, so that it is also found that the extinction coefficient is necessary. When fitting was carried out with a theoretical expression including the extinction coefficient inside the measurement object 10, better fitting was obtained as illustrated in FIG. 7B. Specifically, n=1.49, k=0.002, and the thickness was 0.95 mm, so that a value close to 1.46 which is the refractive index calculated from the interference peak position was obtained. In this way, if the refractive index calculated from the interference peak position is taken as the initial value of fitting, it is possible to reduce a fitting error. Furthermore, the fitting error at this time is 7.35*10$^{-4}$, so that it is understood that better fitting is obtained compared with when the extinction coefficient is fixed to k=0.0.

Furthermore, as a comparative example, fitting was carried out also for the case in which the range of only the zeroth order peak not including the first-order peak was extracted. For the transmittance and the fitting result in this case, no interference depending on the measurement object 10 appears in the transmittance spectrum as illustrated in FIG. 7C. However, n=1.31, k=0.005, thickness was 5.4*10$^{-4}$, and the fitting failed without convergence. The thickness of the measurement object 10 was about 1 mm. Thus, the fitting result above was a largely deviated value. In particular, when the extinction coefficient is small, since it is difficult to obtain thickness information without interference peaks, fitting was carried out with the thickness being fixed to 0.95. As a result, n=1.31, k=0.000003, and the fitting error this time was 1.80. This is considered that the accuracy of fitting deteriorates because the fitting accuracy decreases due to the absence of the interference peak, and because the interference pattern of another optical component remains.

The interference peak position (optical path length) is 2.919 mm, the points before and after it are 2.709 and 3.126 respectively, and the resolution is about 0.21 mm. Thus, it is found that assuming that the thickness of the measurement object 10 is 0.95 mm, the refractive index n1 is in the range of 1.43 to 1.65. Therefore, the result obtained by extracting the range of only the zeroth order peak may be determined as a fitting failure.

As described above, the spectral analysis apparatus 11 according to the embodiment Fourier-transforms the intensity of the electromagnetic wave having passed through the measurement object 10, eliminates the part corresponding to the interference noise from the Fourier transform signal after the Fourier transform, and restores the intensity using the inverse Fourier transform. When eliminating the part corresponding to the interference noise from the Fourier transform signal, the spectrum analysis apparatus 11 includes an electromagnetic wave having passed through the measurement object 10 as it is and an electromagnetic wave having reciprocated once inside the measurement object 10, and eliminates the other electromagnetic waves by multiple reflection and multiple reflection inside another optical component. As a result, the interference noise that occurs at a location other than inside the measurement object 10 is eliminated, and the interference (first order peak) caused by reciprocating once in the measurement object 10 is left. In addition, the spectrum analysis apparatus 11 determines a transmittance spectrum including the interference having reciprocated once inside the measurement object 10, and carries out fitting of the optical constant based on the transmittance spectrum.

When the inverse Fourier transformation is carried out with the first order peak being eliminated, the transmittance spectrum becomes smooth as indicated by the broken line in FIG. 6, but the error at the time of fitting becomes large as illustrated in FIG. 7C. In particular, when the extinction coefficient is small, thickness information is less likely to be obtained. In light of the above, fitting is facilitated by inversely Fourier-transforming the peaks including the first order peak so that information of the interference that is specific to the measurement object 10 is included in the transmittance spectrum. This makes it easier for a user to determine the validity of the fitting result and a cause of the deviation when there is a discrepancy between the fitting result and the measured value. Furthermore, the accuracy of fitting is able to be enhanced. As a result, a precise analysis (calculation of the optical constant) becomes possible.

Generally, when fitting is carried out, fitting parameters are selected so that the square of the difference between the data to be fitted and the calculation formula is small. In the case in which the inverse Fourier transform was carried out with the first order peak being eliminated, no large difference appeared in the fitting error, even if the slope of the broken line indicating the simulation result changes as illustrated in FIG. 7C, so that the fitting did not converge.

On the contrary, in the case in which the inverse Fourier transformation was carried with the first order peak being included, when interference appeared in the transmittance spectrum and the model transmittance spectrum, fitting out of the interference period increased the fitting error. Thus, it is one index (constraint condition) to select the product of n and the thickness of the measurement object 10 so that the interference period matches. Hence, the fitting is easy to converge, and it is likely to reach accurate results. Furthermore, in the example illustrated in FIG. 7B, a difference remains between the transmittance spectrum and the model transmittance spectrum. The difference is the interference pattern of the other optical component appearing in FIG. 7C. The interference due to the first order peak is greater than this interference pattern, so that the fitting error may be decreased by matching the interference period by the first order peak. That is, since there is interference due to the first order peak, fitting with small error maybe performed.

Next, a case in which the complex refraction index is represented using a dielectric model, and is subjected to fitting will be described. In this embodiment, since the measurement object 10 is solid, the complex permittivity may be expressed by a Lorentzian function as represented by Expression (8).

$$\bar{\varepsilon}(\omega) = \frac{A_1}{\omega_1^2 - \omega^2 - i\omega\gamma_1} + \varepsilon_\infty \qquad \text{[Equation 8]}$$

In Expression (8), only one Lorentzian function term is used, but the number of the terms to be used may be determined according to the material of the measurement object 10 and the fitting result. When the measurement object 10 is liquid or a fluid material, it is preferred to incorporate a Debye model term into Expression (8).

Since the complex refraction index may be determined from the dielectric constant, if the equation of the complex refraction index is substituted into Expression (6), an equation of the transmittance spectrum using the dielectric constant model is obtained. Fitting using this equation makes it possible to determine the parameters of the dielectric constant model instead of the complex refractive index (n, k). In other words, it is possible to accommodate even the case in which there is dispersion in the dielectric constant and the complex refractive index.

Actually, the parameters (A1, ω1, γ1, ε) of Expression (8) were fitted to the result of eliminating the second or higher order peak s in FIG. 6. As a result, A1=0.2, ω1=5.32, γ1=5.1, ε∞=2.23. The fitting error this time is $4.43*10^{-4}$, which is further smaller than the fitting error obtained in the case illustrated in FIG. 7B. In the complex refractive index calculated from this, n was 1.496 to 1.493, and k was 0.0006 to 0.003, in the range of 200 to 1000 GHz illustrated in FIGS. 7A and 7B. These ranges are those including values obtained by fitting the complex refractive index without using a dielectric constant model assuming that there is no dispersion. From this matter in addition to the fitting errors, it is found that fitting of the dielectric model is appropriate.

It is preferred that an object whose optical path length is shorter than that of the measurement object 10 does not exist in the optical system. This increases the fitting accuracy.

Furthermore, in this embodiment, the measurement in the case in which the electromagnetic wave passes through the measurement object 10 has been described, but the spectrum analysis apparatus 11 may also be applied to measurement in the case in which the electromagnetic wave is reflected by the measurement object 10. Even in this case, as in the embodiment, the inverse Fourier transform is carried out with the electromagnetic wave having reciprocated once inside the measurement object 10 being included. However, when the electromagnetic wave is reflected by the measurement object 10, the electromagnetic wave of the electric field E (0) illustrated in FIG. 2 does not enter the measurement object 10 but is reflected on the incident surface of the measurement object 10. The electromagnetic wave of the electric field E (1) illustrated in FIG. 2 reciprocates once inside the measurement object 10 and emits from the incident surface of the measurement object 10. The electromagnetic wave of the electric field E (2) illustrated in FIG. 2 reciprocates twice inside the measurement object 10 and emits from the incident surface of the measurement object 10. Furthermore, this case is different from the analyzing section 3 of the embodiment in that the reflectance spectrum, in place of the transmittance spectrum, is calculated from the intensity of the electromagnetic wave obtained by the inverse Fourier transforming unit 33.

Second Embodiment

Figure 9:
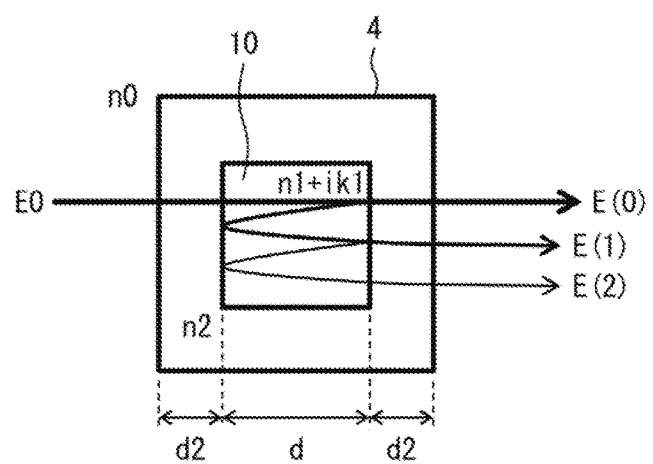
FIG. 9 is a diagram illustrating a transmission-and-reflection state of an electromagnetic wave in a measurement object which has an optical constant to be analyzed by the spectrum analysis apparatus in FIG. 8.
Figure 10:
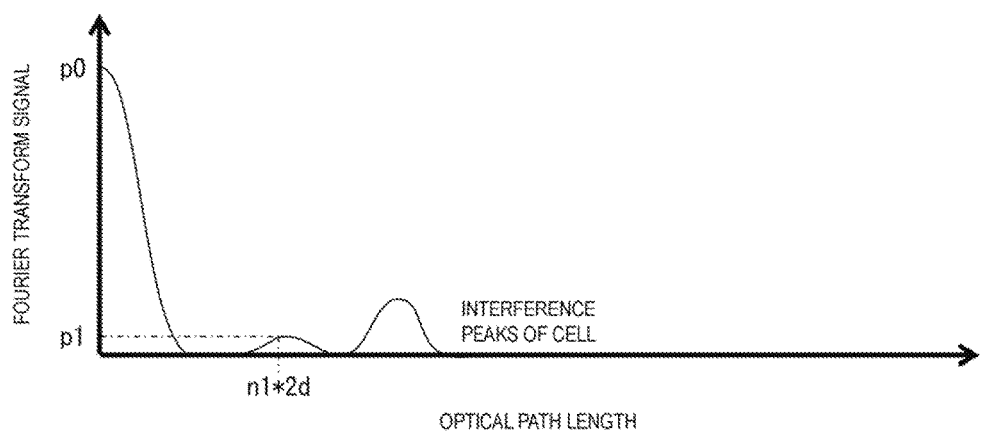
FIG. 10 is a diagram illustrating a Fourier transform signal which is output by a Fourier transforming unit in the spectrum analysis apparatus in FIG. 8.

A second embodiment of the invention will be described with reference to FIGS. 8 to 10. For illustrative convenience, components having identical or similar functions as those described in the First Embodiment are designated by the same reference numerals, and explanation thereof will be omitted.

Figure 8:
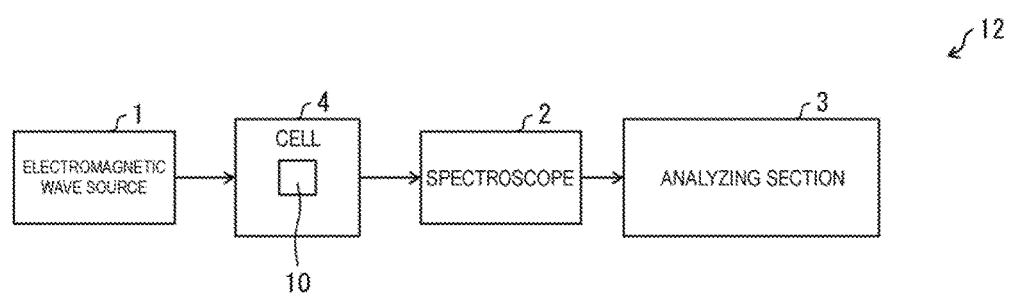
FIG. 8 is a block diagram illustrating a structure of a spectrum analysis apparatus according to a second embodiment of the present invention.

FIG. 8 is a block diagram illustrating a structure of a spectrum analysis apparatus 12 according to the embodiment. FIG. 9 is a diagram illustrating a transmission-and-reflection state of an electromagnetic wave in a measurement object 10 whose physical properties are to be measured by the spectrum analysis apparatus 12. FIG. 10 is a diagram illustrating a Fourier transform signal which is output by a Fourier transforming unit in the aforementioned spectrum analysis apparatus 12.

As illustrated in FIG. 8, the spectrum analysis apparatus 12 includes an electromagnetic wave source 1, a spectrometer 2, and an analyzing section 3, as in the spectrum analysis apparatus 11 of the first embodiment (see FIG. 1). The spectrum analysis apparatus 12 irradiates a liquid measurement object 10 encapsulated in a cell 4 (container) with a continuous electromagnetic wave, detects an emitted electromagnetic wave emitted from the measurement object 10, and calculating the optical constant of the measurement object 10 based on the detected emitted electromagnetic wave.

As described in the First Embodiment, it is preferred that an object whose optical path length is shorter than that of the measurement object 10 does not exist in the optical system. For this reason, the optical path length of the wall thickness of the cell 4 is greater than the optical path length of the measurement object 10. Furthermore, the refractive index of many liquids in the THz band is large 1.5, whereas the refractive index of water is as large as from 2.0 to 4.0. As listed in Table 1, the larger the refractive index of water, the lower the frequency. Furthermore, the frequency range usually measured is often 100 GHz or more. In view of the above, taking into account the refractive index of water at 100 GHz, the wall thickness d2 (wall thickness D) of the cell 4 illustrated in FIG. 9 needs to satisfy the expression below with respect to the refractive index n2 (refractive index N) of the cell 4 and the thickness d of the measurement object 10.

$$5.0*d < n2*d2$$

TABLE 1

| | Frequency (GHz) | | | |
|---|---|---|---|---|
| | 100 | 500 | 1000 | 1500 |
| Refractive Index of Water | 5.0 | 2.37 | 2.15 | 2.0 |

The spectrum analysis apparatus 12 configured as described above measures the optical properties of the measurement object 10 encapsulated in the cell 4 as in the spectrum analysis apparatus 11. Specifically, a spectrometer 2 measures the spectra of emitted electromagnetic waves (electric fields E (0), E (1), E (2), . . . ) emitted from the electromagnetic wave source 1 and transmitted through the cell 4 and the measurement object 10. Furthermore, in an analyzing section 3, a Fourier transform unit 31 Fourier-transforms the intensity of the emitted electromagnetic wave, a noise eliminating unit 32 eliminates peaks other than the zeroth order peak and the first order peak from the Fourier transform signal, and an inverse Fourier transform unit 33 inversely Fourier-transforms the Fourier transform signal from which the peak has been eliminated. A noise eliminating unit 32 eliminates peaks other than the zeroth order peak p0 and the first order peak p1 (including peaks due to interference of the cell 4) from the Fourier transform signal illustrated in FIG. 10. Furthermore, in the analyzing section 3, a spectrum calculating unit 34 determines a transmittance spectrum from a corrected detection signal that is restored by inversely Fourier-transforming, and a fitting unit 35 calculates the optical constant of the measurement object 10 by fitting based on the transmittance spectrum.

As a result of the processing above, similar to the spectrum analysis apparatus 11, a fitting is also facilitated in the spectrum analysis apparatus 12 by including information of the interference that is specific to the measurement object 10 (the first order peak) in the transmittance spectrum. This makes it easier for a user to determine the validity of the fitting result and the cause of the deviation when there is a discrepancy between the fitting result and the measured value. Furthermore, accurate analysis is allowed by enhancing the fitting accuracy. In this way, the same advantageous effects as those of the first embodiment can be also obtained when measuring the measurement object 10 such as a liquid in which the cell 4, that is a component which may cause the interference, has to be used.

Third Embodiment

Hereinafter, a third embodiment of the invention will be described with reference to FIGS. 11 to 13. For illustrative convenience, components having identical or similar functions as those described in the First Embodiment and the Second Embodiment are designated by the same reference numerals, and explanation thereof will be omitted.

Figure 11:
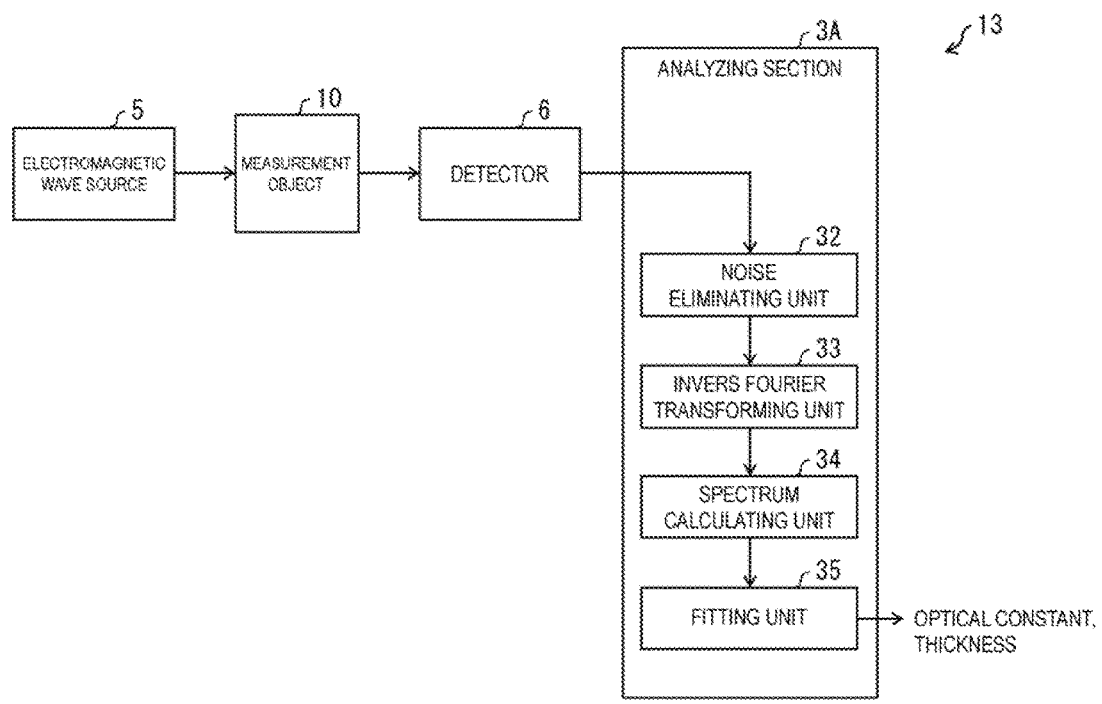
FIG. 11 is a block diagram illustrating a structure of a spectrum analysis apparatus according to a third embodiment of the present invention.
Figure 12:
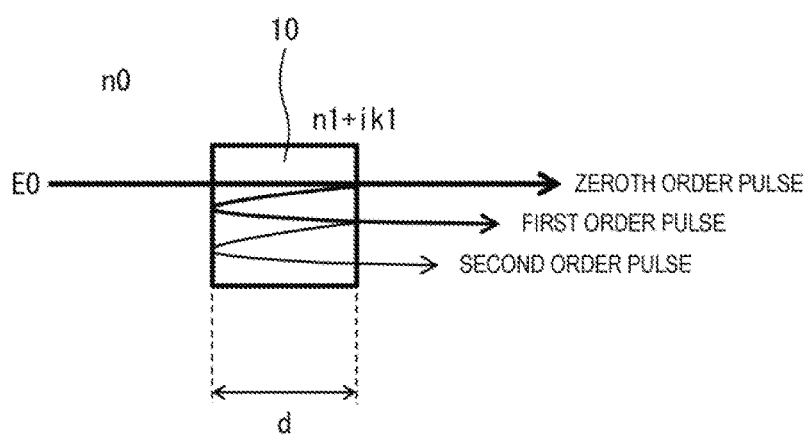
FIG. 12 is a diagram illustrating a transmission-and-reflection state of an electromagnetic wave in a measurement object which has an optical constant to be analyzed by the spectrum analysis apparatus in FIG. 11.

FIG. 11 is a block diagram illustrating a structure of a spectrum analysis apparatus 13 according to the embodiment. FIG. 12 is a diagram illustrating a transmission-and-reflection state of an electromagnetic wave in a measurement object 10 whose optical constant are to be analyzed by the spectrum analysis apparatus 13. FIG. 13 is a diagram illustrating variation in intensity of in intensity of a pulsed electromagnetic wave detected by a detector 6 (detecting section) in the spectrum analysis apparatus illustrated in FIG. 13.

As illustrated in FIG. 11, the spectrum analysis apparatus 13 includes an electromagnetic wave source 5, the detector 6, and an analyzing section 3A. The spectrum analysis apparatus 13 irradiates the measurement object 10 with a pulsed electromagnetic wave, detects an emitted electromagnetic wave emitted from the measurement object 10, and calculates the optical constant and thickness of the measurement object 10 based on the detected emitted electromagnetic wave. This spectrum analysis apparatus 13 uses a THz time-domain spectroscopy.

The electromagnetic wave source 5 generates a pulsed electromagnetic wave in the THz band. For the electromagnetic wave source 5, for example, a device configured to obtain a desired electromagnetic wave by irradiating a THz wave generating element such as a photoconductive switch with a pulse electromagnetic wave emitted from a femtosecond laser is used.

The detector 6 detects a temporal change of the intensity of the pulsed electromagnetic wave (temporal waveform) transmitted through the measurement object 10. For the detector 6, for example, a THz wave detecting element such as a photoconductive switch is used.

The analyzing unit 3A includes a noise eliminating unit 32, an inverse Fourier transforming unit 33, a spectrum calculating unit 34, and a fitting unit 35, same as the analyzing section 3 in the spectrum analysis apparatus 11 of the embodiment 1 (see FIG. 1), but does not have a Fourier transforming unit 31. The noise eliminating unit 32 in the spectrum analysis apparatus 13 is different from the noise eliminating unit 32 in the spectrum analysis apparatus 11, in that unnecessary information of second or higher order pulses and the like (described later) is eliminated in a state of a temporal waveform of the intensity of a pulsed electromagnetic wave detected by the detector 6.

The spectrum analysis apparatus 13 configured as described above measures the optical properties of the measurement object 10. First, the pulsed electromagnetic wave that is output from the electromagnetic wave source 5 passes through the measurement object 10. At this time, a part of the electromagnetic wave (the incident electromagnetic wave) having the electric field E0 passes through the measurement object 10 as the zeroth order pulse, as illustrated in FIG. 12. Meanwhile, a part of the incident electromagnetic wave is reflected by the output surface of the measurement object 10 and is further reflected by the input surface of the measurement object 10, and then, a part thereof is output from the measurement object 10 as a first order pulse. Furthermore, a part of the first pulse is reflected by the output surface of the measurement object 10 and is further reflected by the input surface of the measurement object 10, and then, a part thereof is output from the measurement object 10 as a second order pulse.

As described above, multiple reflection of the electromagnetic wave occurs in the measurement object 10. Thus, the intensity of the zeroth order pulse is strongest, and the first order pulse, the second order pulse, . . . are gradually attenuated in this order. The detector 6 measures the temporal waveform of the intensity of the pulsed electromagnetic wave emitted from the electromagnetic wave source 1 and transmitted through the measurement object 10. For example, a zeroth order pulse is detected at time t0, and a first order pulse is detected at time t1, as illustrated in FIG. 13. Furthermore, the difference between the time t0 and the time t1 is expressed by the following equation.

$$t1-t0=2*n1*d$$

The intensity of the detected electromagnetic wave may be separated by a multiple of $2*n1*d$ by converting the time that the electromagnetic wave reciprocates in the measurement object 10 to the distance. When a pulsed electromagnetic wave is emitted from the electromagnetic wave source 5, and the detector 6 detects the temporal change of the intensity of the pulsed electromagnetic wave (temporal waveform) transmitted through the measurement object 10, the detection result illustrated in FIG. 13 corresponds to the result of Fourier-transforming the spectrum (Fourier transform signal).

Figure 13:
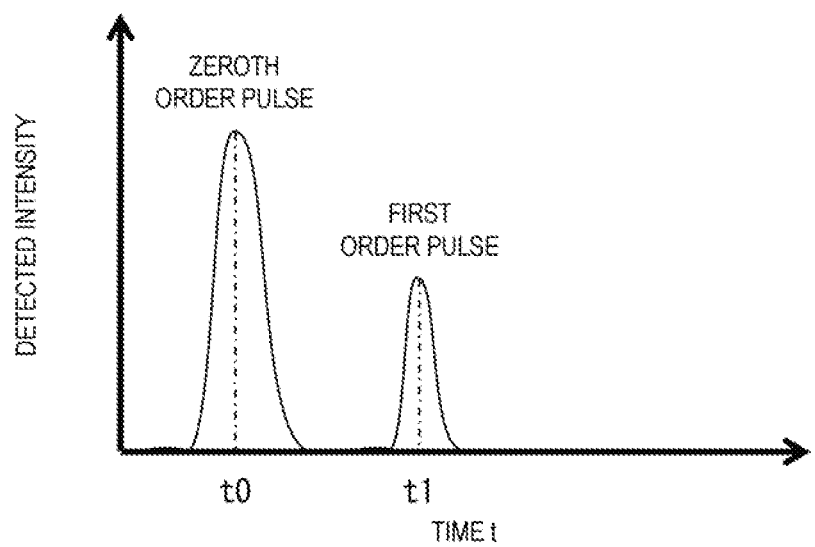
FIG. 13 is a diagram illustrating variation in intensity of a pulsed electromagnetic wave detected by a detector in the spectrum analysis apparatus illustrated in FIG. 11.

In the analyzing section 3A, the noise eliminating unit 32 eliminates pulses other than the zeroth order pulse and the first order pulse from the signal having a detected intensity illustrated in FIG. 13 (Fourier transform signal), and generates a noise eliminated signal. Furthermore, the inverse Fourier transforming unit generates a corrected detection signal. These processing steps are also applied to the measurement results obtained without the measurement object 10. In the analyzing section 3, the spectrum calculating unit 34 determines a transmittance spectrum from the corrected detection signal and a corrected reference detection signal, and furthermore the fitting unit 35 calculates the optical constant of the measurement object 10 by fitting based on the transmittance spectrum.

As described above, the spectral analysis apparatus 13 according to the embodiment eliminates the part corresponding to the interference noise from the intensity of a pulsed electromagnetic wave (temporal waveform) having passed through the measurement object 10, and then restores the part using the inverse Fourier transform. When eliminating the part corresponding to the interference noise from an intensity detection signal, the spectrum analysis apparatus 13 includes an electromagnetic wave having passed through the measurement object 10 as it is (zeroth order pulse) and an electromagnetic wave having reciprocated once inside the measurement object (first order pulse), and eliminates the other electromagnetic waves by multiple reflection and multiple reflection inside another optical component. As a result, the interference noise that occurs at a location other than inside the measurement object 10 is eliminated, and the interference (first order peak) caused by reciprocating once in the measurement object 10 is left. In addition, the spectrum analysis apparatus 13 determines a transmittance spectrum including the interference reciprocating once inside the measurement object 10, and carries out fitting of the optical constant based on the transmittance spectrum.

Typically, to eliminate the interference noise, only the peak at time t0 is extracted, and the spectrum in the frequency domain is obtained using the Fourier transform. In contrast, according to the embodiment, a range including the first order pulse at time t1 is extracted together with the zeroth order pulse at time t0, and then, the Fourier transform is performed to obtain a spectrum in the frequency domain, as illustrated in FIG. 13.

This makes it easier for a user to determine the validity of the fitting result and the cause of the deviation when there is a discrepancy between the fitting result and the measured value. Furthermore, accurate analysis is allowed by enhancing the fitting accuracy. In this way, the same advantageous effects as those of the first embodiment can be also obtained when measuring the measurement object 10 using the THz time-domain spectroscopy.

Realization Example by Software

A control block (in particular, the respective units in the analyzing section 3) of the spectrum analysis apparatus 11 to 13 may be realized by a logic circuit (hardware) formed in an integrated circuit (IC chip) and the like, or by software by using Central Processing Unit (CPU).

In the latter case, the spectrum analysis apparatus 11 to 13 includes a CPU in which a command of a spectrum analysis program, that is software, to realize each function is executed, a Read Only Memory (ROM) or a storage device (these are referred to as "recording medium") in which the above program and various types of data are recorded in a manner capable of being read by a computer (or CPU), a Random Access Memory (RAM) to develop the spectrum analysis program, and the like. Then, when the computer (or CPU) reads the program from the recording medium and executes the spectrum analysis program, an object of the present disclosure is achieved.

As the above recording medium, a "non-temporarily concrete medium", for example, a tape, a disk, a card, a semiconductor memory, a programmable logic circuit and the like may be used. Furthermore, the spectrum analysis program may be supplied to the above computer via any transmission medium (communication network, a broadcast wave, and the like) capable of transmitting the program. It is noted that one embodiment of the present disclosure may be realized in a mode of a data signal embodied by electronically transmitting the above program, where the data signal is embedded in a carrier wave.

A spectrum analysis apparatus according a first configuration of the present disclosure includes an electromagnetic wave source 1 configured to emit an electromagnetic wave having a wavelength from 0.1 mm to 10 mm, a detecting section (the detector 2, the detector 6) configured to detect an emitted electromagnetic wave that exits from the measurement object, the wave being transmitted through or reflected by the measurement object, to generate a detection signal, and an analyzing section 3 configured to analyze the detection signal, wherein the analyzing section 3 includes an electromagnetic wave eliminating unit (the noise eliminating unit 32) configured to eliminate a round-trip electromagnetic wave that has been reciprocated twice or more inside the measurement object and then emitted from the measurement object, and to generate a noise eliminated signal, in the emitted electromagnetic wave, and the analyzing section generates a transmission spectrum or reflection spectrum that is a corrected detection signal by the noise eliminated signal.

The spectrum generated using only the non-round-trip electromagnetic wave without reciprocating inside the measurement object is smooth. However, when the optical constant are fitted using this spectrum, errors occur in the fitting result. In contrast, according to the configuration above, when a spectrum, in which an electromagnetic wave having reciprocated once inside the measurement object and emitted from the measurement object as well as a non-round-trip electromagnetic wave are included, but an electromagnetic wave having reciprocated twice or more inside the measurement object is not included, was generated, and fitting of an optical constant was carried out using the spectrum, a fitting error decreased. This allows to minimize interference noises that occur inside the measurement object, and to enhance fitting accuracy.

In a spectrum analysis apparatus of a second configuration according to the first configuration, the detection signal is a spectrum that depends on optical path length or time, and the analyzing section 3 may further include an inverse Fourier transforming unit 33 for generating the corrected detection signal by inversely Fourier-transforming the noise eliminated signal.

According to the configuration above, the detection signal is a spectrum depending on the emitted electromagnetic wave or time, so that the intensity of a round-trip electromagnetic wave would not be contained in a corrected detection signal that is obtained by eliminating from such a detection signal a round-trip electromagnetic wave having reciprocated twice or more inside the measurement object 10 and then inversely Fourier-transforming the resultant detection signal. In this way, using the corrected detection signal described above enhances the fitting accuracy of the optical constant.

In a spectrum analysis apparatus of a third configuration according to the second configuration, the electromagnetic wave may be a pulsed electromagnetic wave.

According to the configuration above, the incident electromagnetic wave is a pulsed incident electromagnetic wave, so that even in the THz time-domain spectroscopy, it is possible to minimize interference noises that occur inside the measurement object, and to enhance fitting accuracy.

In a spectrum analysis apparatus of a fourth configuration according to the first configuration, the detection signal is a spectrum that depends on wavelength or frequency, the analyzing section 3 further includes a Fourier transforming unit 31 for generating a Fourier transform signal that depends on optical path length x or time by Fourier-transforming the detection signal, and an inverse Fourier transforming unit 33 for generating the corrected detection signal by inversely Fourier-transforming the noise eliminated signal, and the electromagnetic wave eliminating unit may generate the noise eliminated signal by eliminating the round-trip electromagnetic wave from the Fourier transform signal.

According to the configuration above, it is possible to obtain a Fourier transform signal representing a spectrum that depends on optical path length or time, from the intensity of an emitted electromagnetic wave that depends on wavelength or frequency. This allows to easily eliminate the peaks corresponding to the electromagnetic waves emitted from the measurement object after reciprocating twice or more inside the measurement object. Furthermore, the intensity of the electromagnetic wave emitted after reciprocating twice or more would not be contained in the corrected detection signal obtained by inverse Fourier-transforming the noise eliminated signal from which such peaks have been eliminated. In this way, using the corrected detection signal described above enhances the fitting accuracy of the optical constant.

In a spectrum analysis apparatus of a fifth configuration according to any one of the first to fourth configurations, the detection section may detect the electromagnetic wave that directly enters from the electromagnetic wave source 1 without passing through the measurement object 10, and output a reference detection signal, the electromagnetic wave eliminating unit may generate a corrected reference detection signal by eliminating an electromagnetic wave corresponding to time and optical path length that are the same as those of the electromagnetic wave eliminated from the detection signal, and the analyzing section 3 may calculate a transmittance spectrum or a reflectance spectrum by dividing a value of the corrected detection signal by a value of the corrected reference detection signal for each frequency.

According to the configuration above, it is possible to accurately determine the round-trip electromagnetic wave having reciprocated twice or more inside the measurement object 10 and then emitted therefrom with respect to the detection signal by comparing with the reference detection signal. Furthermore, the corrected reference signal is a signal from which the round-trip electromagnetic wave source has been eliminated as in the electromagnetic wave passing through or reflected by the measurement object 10. As a result, the transmittance spectrum is a spectrum from which the interference noise due to the round-trip electromagnetic wave has been eliminated. Thus, the transmittance spectrum obtained by the spectrum calculating unit is determined as a more accurate value in which the aforementioned interference noises are not contained.

A spectrum analysis apparatus of a sixth configuration according to the fifth configuration, further comprises a fitting unit 35 for specifying optical constant and a thickness of the measurement object 10 by fitting correspondingly a model transmittance spectrum or a model reflectance spectrum that is calculated using a dielectric constant model to the transmittance spectrum or reflectance spectrum that is generated by the analyzing section 3.

According to the configuration above, it is possible to obtain the optical constant with high accuracy, since fitting is carried out using the transmittance spectrum or reflectance spectrum generated by the electromagnetic wave that contains the non-round-trip electromagnetic wave and an electromagnetic wave having reciprocated once inside the measurement object and that does not contain the electromagnetic wave having reciprocated twice or more inside the measurement object. Furthermore, using a dielectric constant model allows to avoid a physically meaningless fitting result.

In a spectrum analysis apparatus of a seventh configuration according to the sixth configuration, the fitting unit 35 may use a refractive index calculated from time or optical path length x taken for reciprocating inside the measurement object 10, as an initial value of fitting.

According to the configuration above, since a refractive index close to an actual value is used, a fitting error maybe reduced.

In a spectrum analysis apparatus of an eighth configuration according to any one of the first to seventh configurations, the entering electromagnetic eliminating unit may compare the emitted electromagnetic wave obtained by incident two electromagnetic waves having polarizations different in direction into the measurement object 10, with an electromagnetic wave not incident into the measurement object 10.

According to the configuration above, when the electromagnetic wave having a wavelength from 0.1 mm to 10 mm perpendicularly enters the measurement object, for example, no difference would appear in detection signal and Fourier transform signal but difference would appear in effect of random noise, for example, between the x polarization and the y polarization. Furthermore, difference appears therebetween by the fact that optical adjustment is not complete. These differences do not affect the transmission intensity and affect the optical path length, so that in the Fourier transform signal, the positions of the interference noises due to the non-round-trip electromagnetic wave and the electromagnetic wave having reciprocated once inside the measurement object and emitted therefrom do not change. Thus, when a measurement is carried out using two polarizations which are different in direction, the interference peaks that appear at the same optical position may be identified as derived from the measurement object. Based thereon, it is possible to eliminate the round-trip electromagnetic wave having reciprocated twice or more inside the measurement object 10 and emitted therefrom.

In a spectrum analysis apparatus of a ninth configuration according to any one of the first to eighth configurations, the measurement object 10 may be a liquid encapsulated in a container, and a wall thickness of the container may satisfy $5.0*d < n*D$ with respect to a refractive index n of the container and a thickness d of the measurement object.

It is preferred that an object less than the measurement object in optical path length does not exist within the propagation region of the electromagnetic wave. In light of the above, according to the configuration above, the optical path length of the measurement object is 5.0*d, so that the optical path length of the container n*D has to be longer than the optical path length of the measurement object, taking into account the refractive index (5.0) of water at the frequency of the electromagnetic wave at 100 GHz, Accordingly, if the film thickness D of the container satisfies the conditions above, it is possible to eliminate the electromagnetic waves which have multiple-reflected inside the container wall.

An image processing apparatus of each aspect of the present disclosure may be realized by a computer. In this case, a control program of the image processing apparatus and a computer-readable recording medium fall within the scope of the present disclosure. The control program is configured to realize, by a computer, the image processing apparatus by operating the computer as each unit provided in the image processing apparatus. The computer-readable recording medium is configured to store the control program.

A spectrum analysis method according tenth configuration of the disclosure is for analyzing a detection signal that is generated by detecting an emitted electromagnetic wave emitted from a measurement object 10 as a result that an electromagnetic wave having a wavelength from 0.1 mm to 10 mm is transmitted through or reflected by the measurement object 10, the method includes generating a noise generating a noise eliminated signal by eliminating from the detection signal a round-trip electromagnetic wave having reciprocated twice or more inside the measurement object and then emitted from the measurement object, in the emitted electromagnetic wave, and generating a transmission spectrum or reflection spectrum that is a corrected detection signal by the noise eliminated signal.

The spectrum generated using only the non-round-trip electromagnetic wave without reciprocating inside the measurement object 10 is smooth. However, when the optical constant are fitted using this spectrum, errors occur in the fitting result. In contract, according to the configuration above, the fitting errors reduced when a spectrum was generated using an electromagnetic wave which contains a non-round-trip electromagnetic wave and an electromagnetic wave having reciprocated once inside the measurement object 10 and emitted therefrom, and which does not contain an electromagnetic wave having reciprocated twice or more inside the measurement object 10 and emitted therefrom, and then fitting of the optical constant was carried out using this spectrum. This allows to minimize interference noises that occur inside the measurement object 10, and to enhance the fitting accuracy.

A spectrum analysis method of eleventh configuration of the disclosure according to the tenth configuration includes generating a corrected reference detection signal by eliminating an electromagnetic wave corresponding to time and optical path length that are the same as those of the electromagnetic wave eliminated from the detection signal, from a reference detection signal generated by detecting the electromagnetic wave that directly enters without passing through the measurement object 10, calculating a transmittance spectrum or a reflectance spectrum by dividing a value of the corrected detection signal by a value of the corrected reference detection signal for each frequency, and specifying optical constant and a thickness of the measurement object 10 by fitting correspondingly a model transmittance spectrum or a model reflectance spectrum that is calculated using a dielectric constant model to the transmittance spectrum or reflectance spectrum.

According to the configuration above, it is possible to accurately determine the round-trip electromagnetic wave having reciprocated twice or more inside the measurement object 10 and then emitted therefrom with respect to the detection signal by comparing with the reference detection signal. Furthermore, the corrected reference signal is a signal from which the round-trip electromagnetic wave source has been eliminated as in the electromagnetic wave passing through or reflected by the measurement object 10. As a result, the transmittance spectrum is a spectrum from which the interference noise due to the round-trip electromagnetic wave has been eliminated. Thus, the resultant transmittance spectrum is determined as a more accurate value in which the aforementioned interference noises are not contained.

Furthermore, concerning the transmittance spectrum or reflectance spectrum, it is also possible to obtain the optical constant with high accuracy, since fitting is carried out using the transmittance spectrum or reflectance spectrum generated by the electromagnetic wave that contains the non-round-trip electromagnetic wave and an electromagnetic wave having reciprocated once inside the measurement object 10 and that does not contain the electromagnetic wave having reciprocated twice or more inside the measurement object. Furthermore, using a dielectric constant model allows to avoid a physically meaningless fitting result.

The present disclosure is not limited to each of the above-described embodiments. It is possible to make various modifications within the scope of the claims. An embodiment obtained by appropriately combining technical elements each disclosed in different embodiments falls also within the technical scope of the present disclosure. Furthermore, when technical elements disclosed in the respective embodiments are combined, it is possible to form a new technical feature.

What is claimed is:

1. A spectrum analysis apparatus comprising:
an electromagnetic wave source configured to emit an electromagnetic wave having a wavelength from 0.1 mm to 10 mm;
a detecting section configured to detect an emitted electromagnetic wave from a measurement object, the wave being transmitted through or reflected by the object, and to generate a detection signal; and
an analyzing section configured to analyze the detection signal,
wherein
the analyzing section includes an electromagnetic wave eliminating unit configured to eliminate a round-trip electromagnetic wave that has been reciprocated twice or more inside the measurement object and then emitted from the measurement object, and to generate a noise eliminated signal in the emitted electromagnetic wave,
the analyzing section configured to generate a transmission spectrum or a reflection spectrum that is a corrected detection signal by the noise eliminated signal.

2. The spectrum analysis apparatus according to claim 1, wherein
the detection signal is a spectrum that depends on optical path length or time,
the analyzing section further includes an inverse Fourier transforming configured to generate the corrected detection signal by inversely Fourier-transforming the noise eliminated signal.

3. The spectrum analysis apparatus according to claim 2, wherein the electromagnetic wave is a pulsed electromagnetic wave.

4. The spectrum analysis apparatus according to claim 1, wherein the detection signal is a spectrum that depends on a wavelength or a frequency, the analyzing section further includes:
a Fourier transforming unit configured to generate a Fourier transform signal that depends on optical path length or time by Fourier-transforming the detection signal, and
an inverse Fourier transforming unit configured to generate the corrected detection signal by inversely Fourier transforming the noise eliminated signal,
the electromagnetic wave eliminating unit configured to generate the noise eliminated signal by eliminating the round-trip electromagnetic wave from the Fourier transform signal.

5. The spectrum analysis apparatus according to claim 1, wherein the detection section is configured to detect the electromagnetic wave that directly enters from the electromagnetic wave source without passing through the measurement object, and to output a reference detection signal,
the electromagnetic wave eliminating unit is configured to generate a corrected reference detection signal by eliminating an electromagnetic wave corresponding to time and optical path length that are the same as those of the electromagnetic wave eliminated from the detection signal, and
the analyzing section is configured to calculate a transmittance spectrum or a reflectance spectrum by dividing a value of the corrected detection signal by a value of the corrected reference detection signal for each frequency.

6. The spectrum analysis apparatus according to claim 5, further comprising a fitting unit configured to specify an optical constant and a thickness of the measurement object by fitting correspondingly a model transmittance spectrum or a model reflectance spectrum that is calculated using a dielectric constant model to the transmittance spectrum or the reflectance spectrum that is generated by the analyzing section.

7. The spectrum analysis apparatus according to claim 6, wherein the fitting unit uses a refractive index calculated from time or optical path length taken for reciprocating inside the measurement object, as an initial value of fitting.

8. The spectrum analysis apparatus according to claim 1, wherein the entering electromagnetic eliminating unit is configured to compare the emitted electromagnetic wave obtained by incident two electromagnetic waves having polarizations different in direction into the measurement object, with an electromagnetic wave not incident into the measurement object.

9. The spectrum analysis apparatus according to claim 1, wherein the measurement object is a liquid encapsulated in a container, and
a wall thickness of the container satisfies $5.0*d<N*D$ with respect to a refractive index N of the container and a thickness d of the measurement object.

10. A spectrum analysis method for analyzing a detection signal generated by detecting an emitted electromagnetic wave that emits from a measurement object as a result that an electromagnetic wave having a wavelength from 0.1 mm to 10 mm was transmitted through or reflected by the measurement object, the method comprising:

generating a noise eliminated signal by eliminating from the detection signal a round-trip electromagnetic wave having reciprocated twice or more inside the measurement object and then emitted from the measurement object, in the emitted electromagnetic wave, and generating a transmission spectrum or a reflection spectrum that is a corrected detection signal by using the noise eliminated signal.

11. The spectrum analysis method according to claim 10, comprising:

generating a corrected reference detection signal by eliminating an electromagnetic wave corresponding to time and optical path length that are the same as those of the electromagnetic wave eliminated from the detection signal, from a reference detection signal that is generated by detecting the electromagnetic wave that directly enters without passing through the measurement object;

calculating a transmittance spectrum or a reflectance spectrum by dividing a value of the corrected detection signal by a value of the corrected reference detection signal for each frequency; and specifying an optical constant and a thickness of the measurement object by fitting correspondingly a model transmittance spectrum or a model reflectance spectrum that is calculated using a dielectric constant model to the transmittance spectrum or reflectance spectrum.

* * * * *